(12) United States Patent
Gerzseny et al.

(10) Patent No.: US 7,988,195 B2
(45) Date of Patent: Aug. 2, 2011

(54) STEERING COLUMN ASSEMBLY HAVING ROLLERS TO REDUCE FRICTION DURING COLUMN COLLAPSE

(75) Inventors: Kevin D. Gerzseny, Mt. Morris, MI (US); Michael D. Douponce, Bay City, MI (US); Stephen J. Reider, Frankenmuth, MI (US); Rick B. Dolloff, Davison, MI (US); Richard K. Riefe, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 230 days.

(21) Appl. No.: 12/337,914

(22) Filed: Dec. 18, 2008

(65) Prior Publication Data

US 2009/0174177 A1  Jul. 9, 2009

Related U.S. Application Data

(60) Provisional application No. 61/010,335, filed on Jan. 8, 2008.

(51) Int. Cl.
*B62D 1/00* (2006.01)

(52) U.S. Cl. .......................... 280/777; 74/493; 280/775

(58) Field of Classification Search .................. 280/777, 280/775; 74/492, 493
See application file for complete search history.

(56) References Cited

U.S. PATENT DOCUMENTS

| | | | | |
|---|---|---|---|---|
| 7,322,608 B2* | 1/2008 | Yamamoto et al. | ........... | 280/775 |
| 7,500,414 B2* | 3/2009 | Ishida et al. | ................. | 74/493 |
| 7,607,694 B2* | 10/2009 | Shinohara et al. | ........... | 280/775 |
| 7,798,525 B2* | 9/2010 | Cymbal et al. | ................. | 280/777 |

* cited by examiner

*Primary Examiner* — Eric Culbreth
(74) *Attorney, Agent, or Firm* — Cantor Colburn LLP

(57) ABSTRACT

A steering column assembly includes a column jacket having a jacket portion and a compression bracket attached thereto. The compression bracket includes a planar wall spaced from the column portion and a sidewall extending between the planar wall and the jacket portion. The sidewall defines a telescope slot extending along a longitudinal axis. A shaft extends through the telescope slot of the sidewall. A roller is supported on and rotatable about the shaft, and in rolling engagement with the planar wall. The roller positions the shaft within the telescope slot to prevent sliding frictional engagement between the shaft and the sidewall. The rolling coefficient of friction between the roller and the planar wall is less than the sliding coefficient of friction between the shaft and the sidewall to reduce a frictional load produced during longitudinal collapse of the steering column assembly.

20 Claims, 3 Drawing Sheets

STEERING COLUMN ASSEMBLY HAVING ROLLERS TO REDUCE FRICTION DURING COLUMN COLLAPSE

CROSS REFERENCE TO RELATED APPLICATION

This application claims the benefit of U.S. Provisional Patent Application Ser. No. 61/010,335, filed on Jan. 8, 2008, the disclosure of which is hereby incorporated by reference.

BACKGROUND OF THE INVENTION

1. Field of the Invention

The subject invention relates to a steering column assembly for a vehicle. More specifically, the subject invention relates to a telescopically adjustable steering column assembly adjustable along a longitudinal axis, which is also collapsible along the longitudinal axis in response to a collision event.

2. Description of the Prior Art

Many telescopically adjustable steering column assemblies include a compression bracket coupled to a column jacket that is longitudinally moveable along a longitudinal axis. Typically, the compression bracket defines a telescope slot through which a shaft, e.g., a rake bolt, extends. The column jacket moves relative to the shaft along the longitudinal axis with the telescope slot moving across the shaft between a full-out position in which the column jacket is fully extended and a full-in position in which the column jacket is fully retracted. In the event of a collision, the steering column assembly is collapsible along the longitudinal axis to absorb energy and reduce the likelihood of injury to a driver.

On certain such steering column assemblies, as the column jacket internally collapses along the longitudinal axis, the telescope slots of the compression bracket travel along the shaft in sliding frictional engagement therewith. When the column is under the collapsing loads, the sliding frictional engagement between the shaft and the compression bracket produce a high friction load. This high friction load leads to an undesirably high column-collapsing load. Further, certain vans and other vehicles having a relatively high angle of steering column orientation may have high overturning moments exerted on the column during crash that may induce high sliding friction loads during steering column collapse.

SUMMARY OF THE INVENTION AND ADVANTAGES

The subject invention provides a steering column assembly for a vehicle. The steering column assembly comprises a mounting bracket configured for attachment to the vehicle. A column jacket is coupled to the mounting bracket and extends along a longitudinal axis. The column jacket includes a planar wall and at least one sidewall. The at least one sidewall defines a telescope slot extending along the longitudinal axis. The column jacket is longitudinally moveable along the longitudinal axis relative to the mounting bracket. A shaft is coupled to the mounting bracket and extends through the telescope slot along a shaft axis transverse to the longitudinal axis. At least one roller is rotatably supported on and rotatable about the shaft. The at least one roller is in rolling engagement with the planar wall during the longitudinal movement of the column jacket. The at least one roller positions the shaft within the telescope slot to prevent sliding frictional engagement between the shaft and the at least one sidewall during the longitudinal movement of the column jacket.

Accordingly, the subject invention includes a roller supported on and rotatable about the shaft. The roller engages the planar wall in rolling engagement therewith, and positions the shaft within the telescope slot to prevent sliding frictional engagement between the shaft and the sidewall during longitudinal movement of the column jacket, thereby preventing production of a high sliding frictional load during collapse of the steering column assembly. The rolling engagement between the roller and the planar wall produces a lower rolling coefficient of friction than the high sliding frictional engagement. Therefore, the steering column assembly of the subject invention reduces the frictional load and a resultant steering column overturning force produced during collapse of the steering column assembly.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle and extends along a longitudinal axis 22. The steering column assembly 20 is adjustable in a telescope direction parallel to the longitudinal axis 22, i.e., the steering column assembly 20 is axially adjustable along the longitudinal axis 22.

Figure 1:
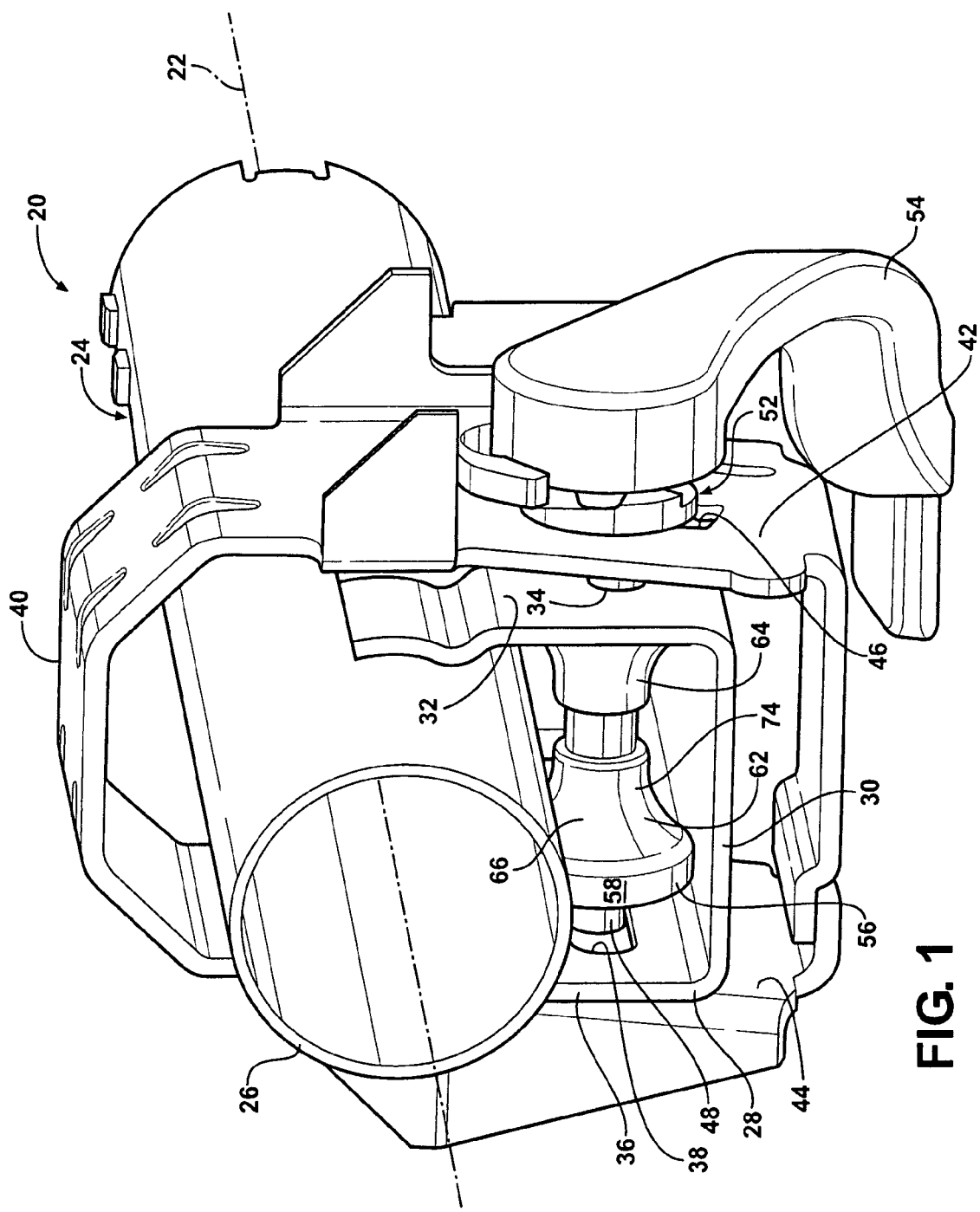
FIG. 1 is a perspective view of a steering column assembly.
Figure 2:
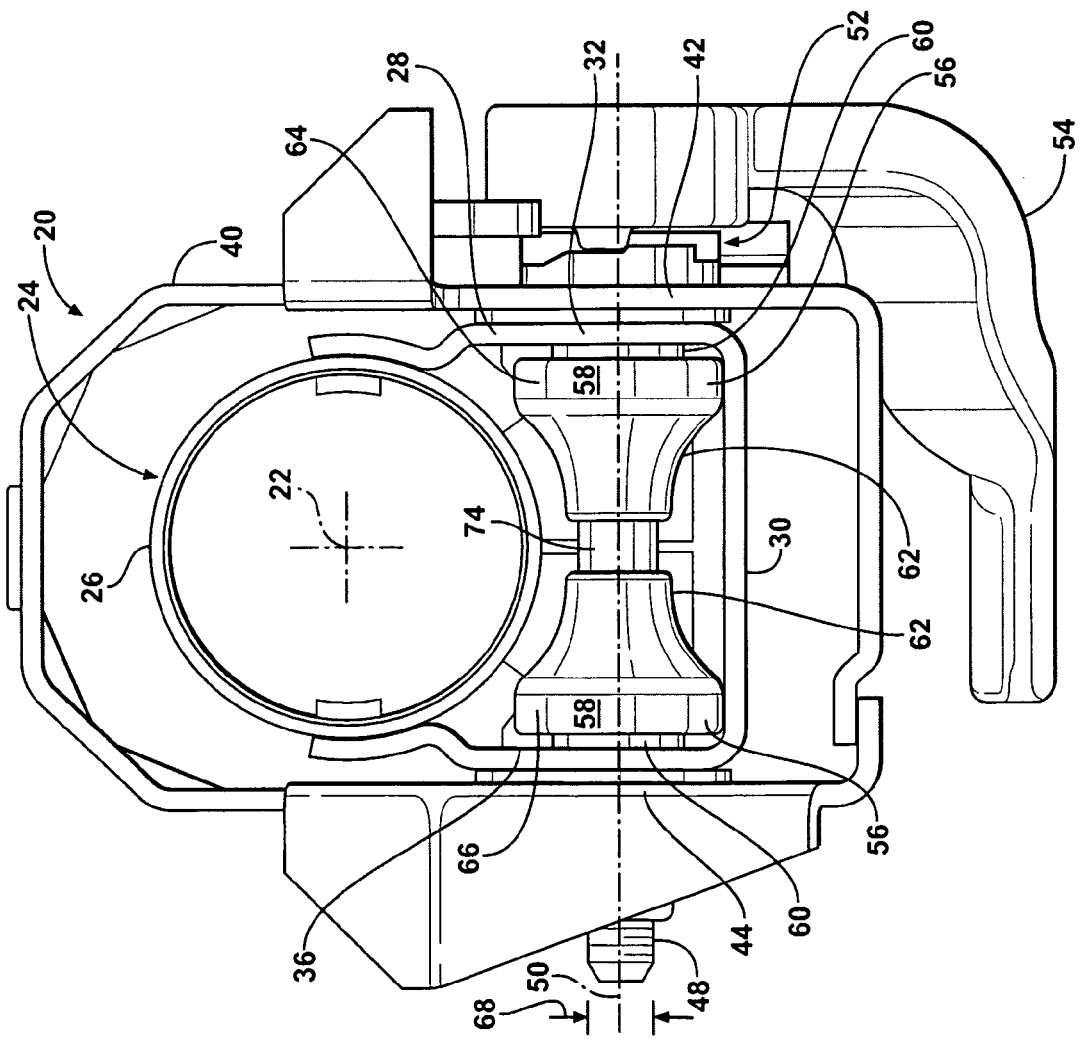
FIG. 2 is an end plan view of the steering column assembly shown in FIG. 1.

Referring to FIGS. 1 and 2, the steering column assembly 20 includes a column jacket 24. The column jacket 24 extends along the longitudinal axis 22. The column jacket 24 includes a jacket portion 26 and a compression bracket 28. The compression bracket 28 is fixedly attached to the jacket portion 26. The compression bracket 28 includes a planar wall 30 spaced from the jacket portion 26, and at least one sidewall 32, 36 extending between the planar wall 30 and the jacket portion 26.

Figure 3:
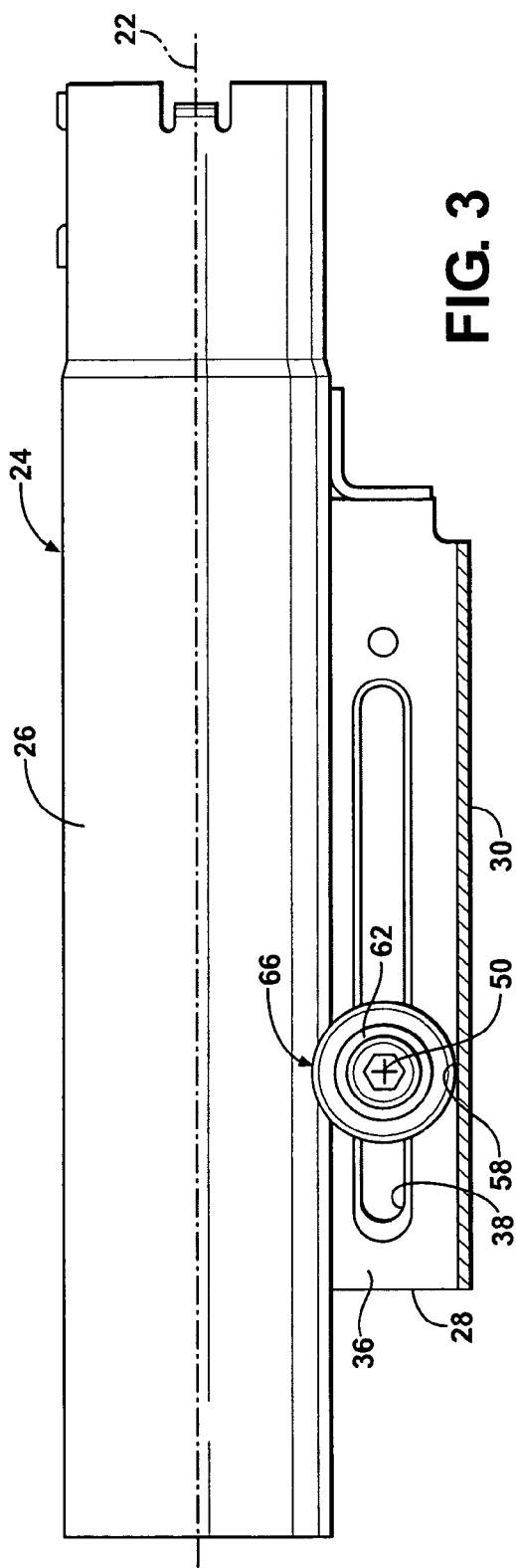
FIG. 3 is a cross sectional view along a longitudinal axis of the steering column assembly in a nominal position.
Figure 4:
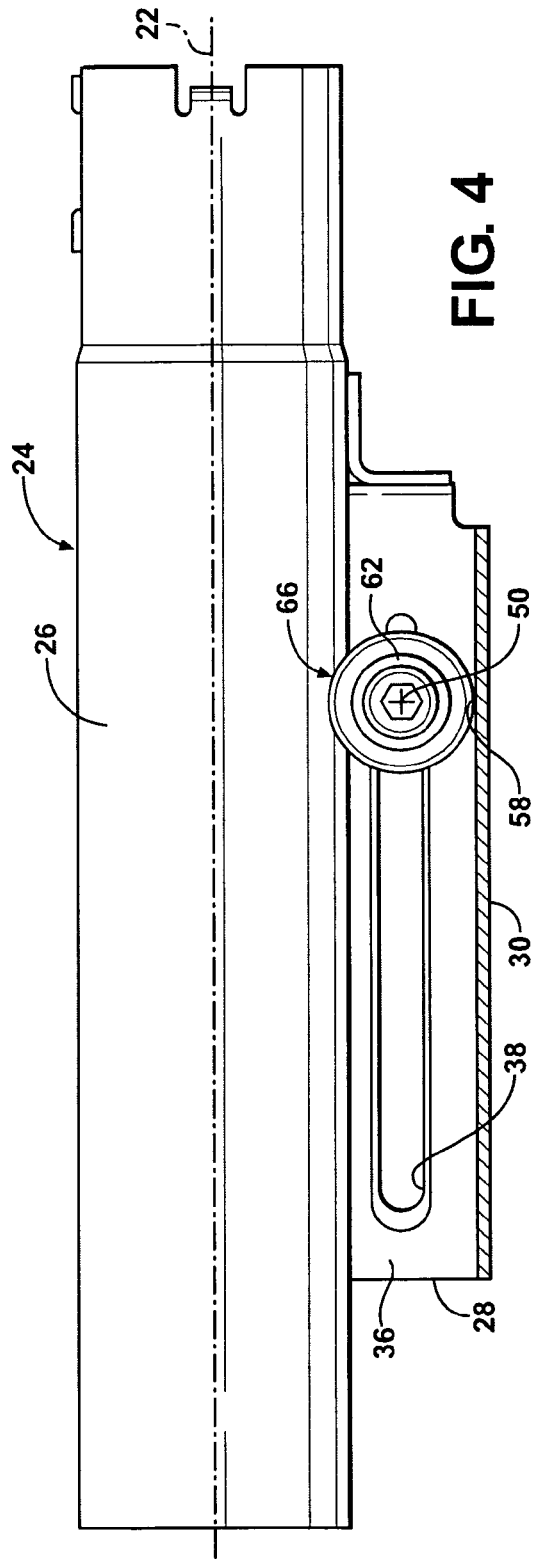
FIG. 4 is a cross sectional view along the longitudinal axis of the steering column assembly in a fully collapsed position.

Referring also to FIGS. 3 and 4, the at least one sidewall 32, 36 defines a telescope slot 34, 38. The telescope slot 34, 38 extends along the longitudinal axis 22. Preferably and as shown, the at least one sidewall 32, 36 includes a first sidewall 32 defining a first telescope slot 34 and a second sidewall 36 defining a second telescope slot 38. Both the first sidewall 32 and the second sidewall 36 extend from the planar wall 30 to the jacket portion 26 of the column jacket 24. As shown, the jacket portion 26 includes a generally round tubular shape. However, it should be appreciated that the jacket portion 26 may include some other shape, such as a rectangular shape. The first sidewall 32 and the second sidewall 36 are disposed on diametrically opposed surfaces of the jacket portion 26.

As best shown in FIGS. 1 and 3, the steering column assembly 20 further includes a mounting bracket 40, i.e., a rake bracket. The mounting bracket 40 is configured for attachment to the vehicle. It should be appreciated that the mounting bracket 40 may be configured in several different configurations for attachment to several different vehicles, and the exact configuration of the mounting bracket 40 and the manner of attaching the mounting bracket 40 to the vehicle is not described herein.

The column jacket 24 is coupled to the mounting bracket 40. Throughout this specification, the term coupled or coupling shall be interpreted to mean that one element is in some manner connected to, attached to, or contacts another element, either directly or indirectly through one or more intervening elements. Accordingly, it should be appreciated that the column jacket 24 may be connected to the mounting bracket 40 in several different ways utilizing one or more different components interconnecting the column jacket 24 and the mounting bracket 40.

Referring to FIGS. 3 and 4, the column jacket 24 is longitudinally moveable along the longitudinal axis 22 relative to the mounting bracket 40. The column jacket 24 is moveable during normal operations to telescopically adjust a position of a steering wheel (not shown) mounted to the steering column assembly 20 along the longitudinal axis 22. Additionally, the column jacket 24 is also collapsible, i.e., moveable, along the longitudinal axis 22 in response to a collision event. Typically, the jacket portion 26 of the column jacket 24 includes a lower jacket (not shown) and an upper jacket. The upper jacket is telescopically disposed over the lower jacket. In the event of a collision event, the upper jacket moves, i.e., collapses, along the longitudinal axis 22 over the lower jacket.

Referring back to FIGS. 1 and 2, the mounting bracket 40 includes a first plate 42 and a second plate 44. The first plate 42 and the second plate 44 are disposed on opposite sides of the column jacket 24, adjacent the first sidewall 32 and the second sidewall 36 of the compression bracket 28 respectively. In other words, the first plate 42 is disposed adjacent to and against the first sidewall 32 and the second plate 44 is disposed adjacent to and against the second sidewall 36.

Optionally, the first plate 42 and the second plate 44 may each define a rake slot 46, i.e., a first rake slot 46 and a second rake slot 46 respectively. The rake slots 46 extend generally transverse to the longitudinal axis 22, and are generally perpendicular to the telescope slots 34, 38. The rake slots 46 permit adjustment of the steering wheel in a vertical direction as is well known.

A shaft 48, i.e., a rake bolt, is coupled to the mounting bracket 40. The shaft 48 extends through the telescope slot along a shaft axis 50 transverse to the longitudinal axis 22. Preferably and as shown, the shaft 48 extends through the first telescope slot 34 and the second telescope slot 38. The shaft 48 also extends through the rake slots 46. It should be appreciated that the shaft 48 does not move with the column jacket 24 during the longitudinal movement of the column jacket 24, and remains stationary along the longitudinal axis 22 relative to the mounting bracket 40 during the longitudinal movement of the column jacket 24.

The steering column assembly 20 includes a locking mechanism 52. The locking mechanism 52 is configured to compress the first plate 42 and the second plate 44 inward against the first sidewall 32 and the second sidewall 36 respectively. The locking mechanism 52 secures a longitudinal position of the column jacket 24 relative to the mounting bracket 40 along the longitudinal axis 22. There are several different locking mechanisms 52 known to those skilled in the art, such as axial camming mechanisms, suitable for use with the subject invention. Accordingly, the exact type and configuration of locking mechanism 52 is not described in detail herein.

Preferably and as shown, the locking mechanism 52 is coupled to the shaft 48. A lever 54 is coupled to the shaft 48. The lever 54 rotates the shaft 48 to actuate the locking mechanism 52 between a locked position fixing the position of the column jacket 24 relative to the mounting bracket 40, and an unlocked position permitting adjustment or movement of the column jacket 24 relative to the mounting bracket 40.

Figure 5:
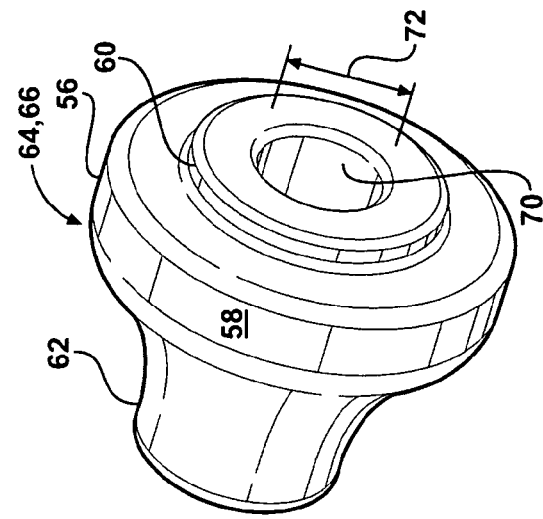
FIG. 5 is a perspective view of a roller of the steering column assembly.

Referring also to FIG. 5, at least one roller 64, 66 is rotatably supported on and rotatable about the shaft 48. As shown with reference to FIGS. 3 and 4, the at least one roller 64, 66 is in rolling engagement with the planar wall 30 during the longitudinal movement of the column jacket 24. The at least one roller 64, 66 positions the shaft 48 within the telescope slot to prevent sliding frictional engagement between the shaft 48 and the at least one sidewall 32, 36 during the longitudinal movement of the column jacket 24.

It should be appreciated that the rolling coefficient of friction between the at least one roller 64, 66 and the planar wall 30 produces a rolling frictional load resisting axial movement of the column jacket 24 along the longitudinal axis 22. However, because the roller positions or centers the shaft 48 within the telescope slot, there is no sliding frictional engagement between the shaft 48 and the at least one sidewall 32, 36. Accordingly, by positioning the shaft 48 within the telescope slot in a manner so that the shaft 48 does not contact the at least one sidewall 32, 36 during longitudinal movement, the steering column assembly 20 eliminates a frictional force generated by the sliding frictional engagement between the shaft 48 and the at least one sidewall 32, 36. Because the rolling coefficient of friction is less than the sliding coefficient of friction, as is well known, the resulting frictional force produced during longitudinal movement of the column jacket 24 of the subject invention is reduced, thereby providing a more predictable steering column collapse stroke.

As best shown in FIGS. 2 and 5, the at least one roller 64, 66 includes a wheel portion 56. The wheel portion 56 defines a rolling surface 58. The rolling surface 58 is disposed radially about the shaft axis 50 for engaging the planar wall 30 in rolling engagement. The at least on roller further includes a guide portion 60. The guide portion 60 is coupled to a first axial end of the wheel portion 56. The guide portion 60 extends axial along the shaft axis 50 from the wheel portion 56 into abutting engagement with the at least one sidewall 32, 36. The guide portion 60 guides the at least one roller 64, 66 parallel to the at least one sidewall 32, 36 and spaces the wheel portion 56 from the at least one sidewall 32, 36. The roller further includes a tapered portion 62. The tapered portion 62 is coupled to a second axial end of the wheel portion 56. The tapered portion 62 extends axial along the shaft axis 50, in a direction opposite the guide portion 60. The tapered section includes a generally conical shape.

Preferably, the at least one roller 64, 66 comprises and is manufactured from a metal. More preferably, the metal includes steel. However, it should be appreciated that the at least one roller 64, 66 may comprise and be manufactured from some other material having a high compression strength sufficient to resist compression in response to the forces applied thereto during collapse of the column jacket 24, such as a polymer material, ceramic material or the like.

Preferably, the tapered portion 62, the wheel portion 56 and the guide portion 60 are integrally formed together from the same material. However, it should be appreciated that the tapered portion 62, the guide portion 60 and the wheel portion 56 may be separate pieces coupled together, and may also each comprise and be manufactured from a different material.

Preferably and as shown, the at least one roller 64, 66 includes a first roller 64 and a second roller 66. The first roller 64 is disposed adjacent to and against the first sidewall 32. The second roller 66 is disposed adjacent to and against the second sidewall 36. More specifically, the guide portion 60 of the first roller 64 is abutting the first sidewall 32, and the guide portion 60 of the second roller 66 is abutting the second sidewall 36.

As best shown in FIG. 2, the shaft 48 includes a shaft diameter 68. As best shown in FIG. 5, the at least one roller 64, 66 defines a central bore 70, with the central bore 70 defining a bore diameter 72. The bore diameter 72 of the central bore 70 is greater than the shaft diameter 68 of the shaft 48 to provide a predetermined clearance between the at least one roller 64, 66 and the shaft 48. The clearance between the at least one roller 64, 66 and the shaft 48 permits flexure of the shaft 48 within the bore. The flexure allows the shaft 48 to properly function during operation of the locking mechanism 52 without binding up within the central bore 70 of the at least one roller 64, 66. Preferably, the bore diameter 72 is at least 100 microns greater than the shaft diameter 68, and more preferably at least 150 microns greater than the shaft diameter 68.

Referring back to FIGS. 1 and 2, a spacer 74 is supported on the shaft 48. The spacer 74 is disposed between the first roller 64 and the second roller 66. The spacer 74 maintains a position of the first roller 64 and the second roller 66 relative to the first sidewall 32 and the second sidewall 36 respectively. Accordingly, it should be appreciated that the spacer 74 prevents the first roller 64 and/or the second roller 66 from sliding along the shaft 48 and out of proper position, i.e., the spacer 74 maintains the proper position and alignment of the first roller 64 and the second roller 66 relative to the first sidewall 32 and the second sidewall 36. Preferably, the spacer 74 comprises and is manufactured from a polymer material, i.e., a plastic material. However, it should be appreciated that the spacer 74 may comprise and be manufactured from some other material, such as a metal, ceramic, or some other suitable material.

The first roller 64, the spacer 74 and the second roller 66 may be integrally formed together from the same material. However, it should be appreciated that the first roller 64, the spacer 74 and the second roller 66 may also be separate pieces merely abutting each other, and each include and be manufactured from different materials.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said steering column assembly comprising:
   a mounting bracket configured for attachment to the vehicle;
   a column jacket coupled to said mounting bracket and extending along a longitudinal axis and including a compression bracket, said compression bracket having a planar wall and at least one sidewall defining a telescope slot extending along said longitudinal axis with said column jacket longitudinally moveable along said longitudinal axis relative to said mounting bracket;
   a shaft coupled to said mounting bracket and extending through said telescope slot along a shaft axis transverse to said longitudinal axis; and
   at least one roller rotatably supported on and rotatable about said shaft and in rolling engagement with said planar wall during said longitudinal movement of said column jacket, said at least one roller configured to contact said planar wall to position said shaft within said telescope slot such that said shaft does not contact said at least one sidewall of said compression bracket to prevent sliding frictional engagement between said shaft and said at least one sidewall during said longitudinal movement of said column jacket.

2. A steering column assembly as set forth in claim 1 wherein said shaft includes a shaft diameter and said at least one roller defines a central bore defining a bore diameter greater than said shaft diameter to permit flexure of said shaft within said bore.

3. A steering column assembly as set forth in claim 2 wherein said bore diameter is at least 150 microns greater than said shaft diameter.

4. A steering column assembly as set forth in claim 1 wherein said at least one roller includes a wheel portion defining a rolling surface disposed radially about said shaft axis for engaging said planar wall.

5. A steering column assembly as set forth in claim 4 wherein said at least one roller includes a guide portion coupled to a first axial end of said wheel portion and extending axial along said shaft axis from said wheel portion into abutting engagement with said at least one sidewall to space said wheel portion from said at least one sidewall.

6. A steering column assembly as set forth in claim 5 wherein said roller includes a tapered portion coupled to a second axial end of said wheel portion and extending axial along said shaft axis.

7. A steering column assembly as set forth in claim 6 wherein said roller comprises a metal.

8. A steering column assembly as set forth in claim 7 wherein said metal includes steel.

9. A steering column assembly as set forth in claim 7 wherein said tapered portion, said wheel portion and said guide portion are integrally formed together.

10. A steering column assembly as set forth in claim 1 wherein said at least one sidewall includes a first sidewall defining a first telescope slot and a second sidewall defining a second telescope slot.

11. A steering column assembly as set forth in claim 10 wherein said shaft extends through said first telescope slot and said second telescope slot.

12. A steering column assembly as set forth in claim 11 wherein said at least one roller includes a first roller disposed adjacent said first sidewall and a second roller disposed adjacent said second sidewall.

13. A steering column assembly as set forth in claim 12 further comprising a spacer supported on said shaft and disposed between said first roller and said second roller to maintain a position of said first roller and said second roller relative to said first sidewall and said second sidewall respectively.

14. A steering column assembly as set forth in claim 13 wherein said first roller, said spacer and said second roller are integrally formed together.

15. A steering column assembly as set forth in claim 12 wherein said mounting bracket includes a first plate and a second plate disposed on opposite sides of said column jacket adjacent said first sidewall and said second sidewall respectively.

16. A steering column assembly as set forth in claim 15 further comprising a locking mechanism configured to compress said first plate and said second plate inward against said first sidewall and said second sidewall respectively to secure a longitudinal position of said column jacket relative to said mounting bracket.

17. A steering column assembly as set forth in claim 16 wherein said locking mechanism is coupled to said shaft.

18. A steering column assembly as set forth in claim 17 further comprising a lever coupled to said shaft for rotating said shaft to actuate said locking mechanism.

19. A steering column assembly as set forth in claim 1 wherein said column jacket includes a jacket portion and the compression bracket is attached to said jacket portion wherein said planar wall is spaced from said jacket portion and said at least one sidewall extends between said planar wall and said jacket portion.

20. A steering column assembly for a vehicle, said steering column assembly comprising:
- a mounting bracket configured for attachment to the vehicle;
- a column jacket coupled to said mounting bracket and extending along a longitudinal axis and including a compression bracket, said compression bracket having a planar wall and at least one sidewall defining a telescope slot extending along said longitudinal axis with said column jacket longitudinally moveable along said longitudinal axis relative to said mounting bracket;
- a shaft coupled to said mounting bracket and extending through said telescope slot along a shaft axis transverse to said longitudinal axis; and
- at least one roller rotatably supported on and rotatable about said shaft and in rolling engagement with said planar wall during said longitudinal movement of said column jacket, said at least one roller having a wheel portion, a guide portion, and a tapered portion, said guide portion coupled to a first axial end of said wheel portion, and said tapered portion coupled to a second axial end of said wheel portion and extending axial along said shaft axis, said wheel portion disposed radially about said shaft axis for engaging said planar wall, said guide portion extending axially along said shaft axis from said wheel portion into abutting engagement with said at least one sidewall to space said wheel portion from said at least one sidewall, said at least one steel roller configured to contact said planar wall to position said shaft within said telescope slot such that said shaft does not contact said at least one sidewall of said compression bracket to prevent sliding frictional engagement between said shaft and said at least one sidewall during said longitudinal movement of said column jacket.

* * * * *